G. A. CAMPBELL.
SIGNALING CIRCUIT.
APPLICATION FILED SEPT. 9, 1916.

1,254,471.

Patented Jan. 22, 1918.
5 SHEETS—SHEET 3.

WITNESSES:
Joseph A. Gately
Elizabeth A. Hill

INVENTOR
George A. Campbell
BY
Thomas D. Lockwood
ATTORNEY

G. A. CAMPBELL.
SIGNALING CIRCUIT.
APPLICATION FILED SEPT. 9, 1916.

1,254,471.

Patented Jan. 22, 1918.
5 SHEETS—SHEET 4.

WITNESSES:
Joseph A. Gately
Elizabeth A. Hill

INVENTOR
George A. Campbell
BY
Thomas D. Lockwood
ATTORNEY

G. A. CAMPBELL.
SIGNALING CIRCUIT.
APPLICATION FILED SEPT. 9, 1916.

1,254,471.

Patented Jan. 22, 1918.
5 SHEETS—SHEET 5.

WITNESSES:
Joseph A. Gately
Elizabeth A. Hill.

INVENTOR
George A. Campbell
BY
Thomas D. Lockwood
ATTORNEY

UNITED STATES PATENT OFFICE.

GEORGE A. CAMPBELL, OF MONTCLAIR, NEW JERSEY, ASSIGNOR TO AMERICAN TELEPHONE AND TELEGRAPH COMPANY, A CORPORATION OF NEW YORK.

SIGNALING-CIRCUIT.

1,254,471.   Specification of Letters Patent.   Patented Jan. 22, 1918.

Application filed September 9, 1916. Serial No. 119,282.

*To all whom it may concern:*

Be it known that I, GEORGE A. CAMPBELL, residing at Montclair, in the county of Essex and State of New Jersey, have invented certain Improvements in Signaling-Circuits, of which the following is a specification.

This invention relates to circuit arrangements for signaling systems wherein signals may be either transmitted from or received at the same station. In its more specific aspects this invention is embodied in a subscriber's telephone station, hereinafter termed, in accordance with common usage, a substation, and more particularly in the combination of a substation and a telephone line. Its object is to provide a signaling circuit arrangement which in coöperative combination with a similar and equal communicating arrangement or station shall deliver the maximum amount of energy to the receiving apparatus of said communicating station or arrangement. A further object is to provide an arrangement such that the receiving apparatus is protected from interference by the transmission energy originating at the same station. In other words its object is to provide signaling means characterized by the maximum possible ratio of received and transmitted energy and further characterized by the absence of side tone.

The object of the invention is attained, in its specific aspect, by providing a substation consisting of transmitter, receiver, auxiliary resistance, and a transformer having a plurality of windings which, in combination with a telephone line, shall satisfy the following fundamental requirement: Given two identical substations designed for invariable two-way communication, and connected by a line of given impedance and length, the amount of energy absorbed by the receiver at the receiving station shall be the maximum part of the total telephonic energy developed by the transmitter at the transmitting station consistent with invariable two-way communication, and, as hereinafter explained, consistent with a desirable amount of discrimination against disturbing line noise. This fundamental requirement may be stated in terms of the following subordinate requirements which are necessary for its satisfaction: (1) the transmitter and receiver shall be conjugate, that is there shall be negligible side tone in the receiver in consequence of the actuation of the transmitter by sound waves; (2) the line and auxiliary resistance shall be conjugate in order that none of the energy absorbed by the substation from the line shall be wasted in said auxiliary resistance; (3) for a given line having a definite impedance the telephonic energy delivered by the transmitter shall be a maximum; (4) the amount of energy delivered by the line to the substation shall be a maximum, in other words the impedance of the substation as seen from the line shall be equal to the impedance of the line; (5) at a small sacrifice of efficiency it shall be possible to discriminate effectively against disturbing line noise as distinguished from the telephonic signals from the communicating station.

A substation satisfying the above-mentioned requirements is ideal in that its overall efficiency from transmitter of one substation to receiver of the communicating substation is a theoretical maximum which cannot be exceeded by any invariable substations whether satisfying the requirement of transmitter and receiver conjugacy or not. It is further ideal in the sense that a minimum number of elements is employed since at least one auxiliary element is necessary to secure freedom from side tone.

It might be inferred that the addition of an auxiliary resistance element, necessary as it is to secure freedom from side tone, would at the same time necessarily reduce the efficiency of the substation since energy is unavoidably wasted in said auxiliary resistance. That this is not the case and that the efficiency of the substation of my invention is a theoretical maximum which cannot be exceeded by any two-way substation whether with or without side tone, the following considerations will show. The simplest form of substation for invariable two-way communication is that in which the receiver and transmitter are connected in series with each other across the line. In such an arrangement the over-all efficiency is a maximum when the resistance of the receiver is equal to that of the transmitter. When this condition is satisfied obviously fifty per cent. of the energy delivered by the line to the substation is wasted in the transmitter and fifty per cent. of the energy delivered by the transmitter is wasted in the receiver. Further such an arrangement labors under the disadvantage of full side tone. In the substation of my invention fifty per cent. of the energy delivered by the line to the substation is wasted in the transmitter but none in the auxiliary resistance if said auxiliary resistance and said line are conjugate; hence the efficiency of receiving is as great as that of the simple series substation. When transmitting no energy is wasted in the receiver but fifty per cent. of the energy delivered by the transmitter is wasted in the auxiliary resistance. The transmitting efficiency is therefore also a theoretical maximum and neither transmitting nor receiving efficiency is reduced by the addition of the auxiliary resistance which is necessary to secure freedom from side tone. The foregoing consideration will serve to explain the desirability of having the line and auxiliary resistance conjugate as well as the transmitter and receiver.

In my present invention I provide a substation comprising transmitter, receiver, auxiliary resistance and transformer, and so proportion said component elements and so relate them to a telephone line and to each other that, in combination with said telephone line, said substation satisfies all of the foregoing requirements.

I have discovered that the above-mentioned requirements may be satisfied by a large number of arrangements employing the minimum number of elements and all equally efficient and without side tone. While theoretically all these arrangements are equally good, practical considerations make certain arrangements preferable.

My invention is best understood by reference to the accompanying drawings in which:

Fig. 4 is a diagram showing a modification of the fundamental type of substation while

Fig. 7 is a diagram showing a second modification while

Fig. 10 is a diagram of a third modification while

Figs. $1^a$, $4^a$, $7^a$, $10^a$, $13^a$, and $14^a$ are schematic diagrams of the substation of Figs. 1, 4, 7, 10, 13 and 14 respectively showing more clearly their essential equivalence.

In order to illustrate the scope of my invention and elucidate the principles on which all specific embodiments rest, a general theoretical discussion will now be given which applies to all substations satisfying the requirements heretofore stated in this specification. In this discussion and the equations and formulæ included in this specification the subscripts 1, 2, 3 and 4 will refer to transmitter, receiver, auxiliary resistance and line respectively. Thus $I_1$, $I_2$, $I_3$, $I_4$ will denote the currents flowing in transmitter, receiver, auxiliary resistance and line respectively, while $R_1$ will denote the resistance of the transmitter, $R_2$ the resistance of the receiver, etc.

Consider a substation consisting of transmitter, receiver, auxiliary resistance and appropriate transformer windings, connected to a line of given impedance. In practice the line connects two similar and equal substations between which communication is established. It is a well known principle that if a terminal impedance is connected to a source of electromotive force through a line of impedance $$Z = R_4 + iR'_4,$$

where $R_4$ is the resistance and $R'_4$ the reactance component of the impedance, the terminal impedance must be $R_4 - iR'_4$ for maximum absorption of energy. In particular if the line impedance has no reactance component, the impedance of the terminal arrangement as seen from the line should be equal to the resistance component of the impedance of the line. The condition, then, that the substation shall have maximum energy absorption from the line is that its impedance, as seen from the line, shall be equal to the line impedance. The significance of the foregoing statement may be explained by reference to Fig. 4 as follows: Let the substation be disconnected from the line and let the impedance of the substation be measured across terminals 26 and 20. Then the impedance so measured shall be equal to the impedance of the line. With the line terminated at each end by a substation satisfying this condition, the line may be replaced, as regards transmission from either substation, by an impedance element of resistance equal to the impedance of the line. Any reactance effect, which is in practice small, may be eliminated by neutralizing reactance and, therefore, need not be considered. The condition, then, that the substation have maximum energy absorption from the line is that its impedance as seen from the line be pure resistance of value equal to the impedance of the line. This condition is evidently equivalent to the following requirement; let an electromotive force be impressed on the substation terminals through a resistance equal to the impedance of the line; then the energy consumed in the substation shall be equal to the energy consumed in said resistance.

Further, line and auxiliary resistance are conjugate by requirement (2), as hereinbefore stated, or in other words, the auxiliary resistance is connected to points of equal potential with respect to an electromotive force applied to the line terminals. Moreover, the impedance of the substation as seen from the line should be equal to that of the line. Let, then an electromotive force $E_4$ be impressed through a resistance $R_4$ on a substation whose transmitter and receiver resistances are $R_1$ and $R_2$ respectively, and let the resultant currents in line, transmitter and receiver be $I_4$, $I_1$ and $I_2$ respectively; then the impedance across the substation terminals must be $R_4$ as seen from the line and the total resistance in series with $E_4$ is $2R_4$, and since the current in the line is $I_4$, it follows that $$\frac{E_4}{2R_4} = I_4$$

The total energy consumed may then be expressed by the formula $$I_4{}^2R_4 + I_1{}^2R_1 + I_2{}^2R_2 = I_4E_4 = \frac{E_4{}^2}{2R_4}$$

Since the energy consumed by the substation is equal to that consumed by the resistance $R_4$ and is therefore one half of the total energy consumed, it follows that requirement 4 may be formulated by the following equation:

$$R_4I_4{}^2 = I_2{}^2R_2 + I_1{}^2R_1 = \frac{E_4{}^2}{4R_4} \quad (1)$$

This equation states that the energy consumption in the resistance $R_4$ is equal to that in the substation, and that the substation is equivalent, as seen from the line, to a resistance of value $R_4$.

Similarly, if transmitter and receiver are conjugate the condition that the transmitter shall have its maximum output to line and auxiliary resistance may be formulated as follows: Let an electromotive force $E_1$ in the transmitter produce currents $I_1$, $I_4$ and $I_3$ in transmitter, line and auxiliary resistance. Then, for maximum output, it follows that:

$$I_1{}^2R_1 = I_4{}^2R_4 + I_3{}^2R_3 = \frac{E_1{}^2}{4R_1} \quad (2)$$

Equation (2) is the analogue of equation (1) and may be interpreted as follows by reference to Fig. 4: Let the transmitter be disconnected from terminals 25 and 21 and let the impedance be measured across said terminal. Then if equation (2) is satisfied the impedance so measured is equal to the impedance of the transmitter itself. In other words, the impedance of the combination, as seen from the transmitter is equal to that of the transmitter itself.

As hereinafter shown for the particular embodiments of my invention, equation (2) follows as a consequence of the conditions of double conjugacy and equation (1). Therefore the foregoing four requirements impose but three restrictions on the substation.

To complete the general discussion it remains to consider the energy division between receiver and transmitter when receiving, and between line and auxiliary resistance when transmitting. Let $W_0$ be the total amount of telephonic energy developed by the transmitter at the transmitting substation; then, by equation (2), $1/2W_0$ is the amount of energy delivered to the line and auxiliary resistance. Let the amount of energy taken by the auxiliary resistance be $x$ times that taken by the line, then the amount of energy taken by the line is $$1/2W_0 \frac{1}{(1+x)}$$

so that the transmitting efficiency is measured by $$\frac{1}{(1+x)} \quad (3)$$

Of the total energy delivered to the receiving substation, let the transmitter absorb $y$ times that absorbed by receiver; then the receiving efficiency is measured by $$\frac{1}{(1+y)} \quad (4)$$

The over-all efficiency from transmitter of one station to receiver of communicating station is clearly proportional to the product of the transmission efficiency and receiving efficiency; therefore the over-all efficiency is by formulæ (3) and (4):

$$\left(\frac{1}{1+x}\right)\left(\frac{1}{1+y}\right)$$

If $x$ and $y$ were independent, clearly the over-all efficiency would be a maximum for $x=y=0$. For all substations embodying the principles of my invention it may be readily shown, however, that $x$ and $y$ are connected by the relation $xy=1$. Eliminating $x$ from the above formula by means of this relation, the expression for the over-all efficiency becomes $$\frac{y}{(1+y)^2} \quad (5)$$

In order to demonstrate the above statement, namely that $xy=1$, designate the elements or branches T, R, X and L by 1, 2, 3 and 4, respectively, and let 1 and 2 be conjugate and also 3 and 4 be conjugate. Further it will be assumed for an electromotive force in branch 4, equation (1) is satisfied while for an electromotive force in branch (1), equation (2) is satisfied. Let $S_{11}$ denote the current produced in branch or element 1 by a unit electromotive force in branch 1, $S_{12}$ the current produced in branch 2 by a unit electromotive force in branch 1, etc. Then by the conjugacy of branches 1 and 2 and branches 3 and 4, it follows that $$S_{12}=S_{34}=0.$$

Also by equation (1)

$$S_{44}{}^2R_4 = S_{42}{}^2R_2 + S_{41}{}^2R_1 = \frac{1}{4R_4} \quad (1')$$

and by equation (2)

$$S_{11}{}^2R_1 = S_{13}{}^2R_3 + S_{14}{}^2R_4 = \frac{1}{4R_1} \quad (2')$$

Now it is a fundamental principle which is deducible from elementary algebra, that $S_{41}=S_{14}$. That is, the current set up in branch 1 by a unit electromotive force in branch 4 is equal to the current set up in branch 4 by a unit electromotive in branch 1. Multiplying equation (1') by $R_4$ and equation (2') by $R_1$ and subtracting it follows that:

$$S_{42}{}^2R_2R_4 = S_{13}{}^2R_1R_3 \quad (a)$$

Now in accordance with the notation adopted in this specification, the energy consumed in branch 3 is $x$ times that consumed in branch 4 when an electromotive force acts in branch 1; therefore $$S_{13}{}^2R_3 = xS_{14}{}^2R_4 \quad (b)$$

Also the energy consumed in branch 1 is $y$ times that consumed in branch 2 when an electromotive force acts in branch 4; whence $$S_{14}{}^2R_1 = yS_{24}{}^2R_2 \quad (c)$$

Multiplying (b) and (c)

$$S_{13}{}^2R_1R_3 = xyS_{24}{}^2R_2R_4 \quad (d)$$

From (a) and (d) it follows at once that $xy=1$.

Obviously the expression given by formula (5) is a maximum when $y=1$. This means that for a given amount of telephonic energy developed in the transmitter at the transmitting substation a maximum amount is usefully delivered to the receiver at the receiving substation connected by the line, when $y=1$. Since the maximum amount of energy in the receiver is the prime desideratum of telephony, it would appear that the substation should be designed to make $y=1$. Another consideration, however, modifies this conclusion somewhat, namely, the effect of line noise. Since the line noise originates in the line the amount delivered to the receiver is proportional to $$\frac{1}{1+y}$$

(see equation 4) while the amount of energy delivered from the transmitter of the communicating station is proportional to $$\frac{y}{1+y^2}$$

(see equation 5). The ratio of the latter to the former is $$\frac{y}{1+y}$$

and this increases as $y$ increases beyond unity. It will be clear, then, that if $y$ is made greater than unity the substation discriminates against line noise as compared with the signals it is desired to receive. The amount of discrimination desired depends of course on the amount of line noise present. For conditions occurring in practice I have found by experiment that a desirable value for $y$ is 1.4. With this value of $y$ the over-all efficiency is reduced 2.8% below the maximum for $y=1$, while the receiving efficiency alone is reduced 16.6%. It is thus seen that a good degree of discrimination against line noise is obtained with a small loss in over-all efficiency.

The above consideration as to over-all efficiency and discrimination against line noise may be formulated as $$R_1I_1{}^2 = yR_2I_2{}^2 \quad (6)$$

for an electromotive force inserted in the line. In this equation $y$ is to have a value lying between 1 and 1.5 preferably.

Figure 1:
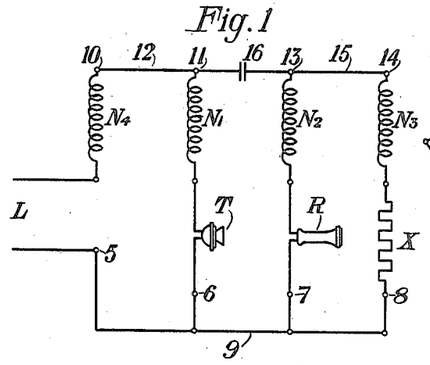
Figure 1 is a diagram illustrating the fundamental type of substation, of which the substations illustrated in succeeding drawings are modifications.
Figure 1A:
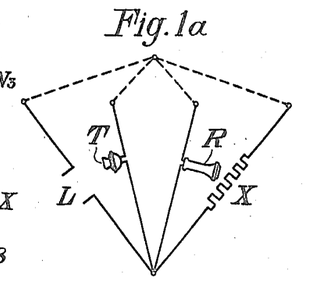

Proceeding now to a description of the specific circuits, in Fig. 1 a telephone line L is shown as connected to a substation comprising a transmitter T, a receiver R, an auxiliary resistance X, and a transformer having four windings $N_1$, $N_2$, $N_3$ and $N_4$. Said windings are on the same magnetic circuit and the transformer is preferably designed to have very small leakage. The individual windings should for the best operation have high self impedances and low resistances. Terminals 5, 6, 7 and 8 of line, transmitter, receiver and auxiliary resistance are connected together by conductor 9 so that said elements have in effect a common terminal. Windings $N_4$, $N_1$, $N_2$ and $N_3$ are connected in series with line, transmitter, receiver and auxiliary resistance respectively. Terminals 10 and 11 of windings $N_4$ and $N_1$, respectively, are connected together by conductor 12 while terminals 13 and 14 of windings $N_2$ and $N_3$ are connected together by conductor 15. Conductors 12 and 15 are connected by condenser 16. The function of condenser 16 is to confine the direct-current battery supply current, transmitted to the substation over line 1, to the transmitter and to exclude it from the receiver and auxiliary resistance. Said condenser should therefore be of relatively large capacity so as to have negligible impedance at telephonic frequency. What impedance it presents at telephonic frequencies is largely neutralized by the unavoidable magnetic leakage of the transformer so that the effect of said condenser will be ignored as regards the true telephonic currents as distinguished from the direct battery supply current.

Figure 2:
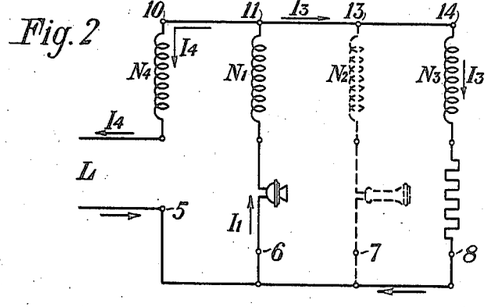
Figs. 2 and 3 are diagrams illustrating the current flow in the substation of Fig. 1 during transmission and reception respectively.

Referring to Fig. 2 which is a diagram illustrating the operation of transmitting in which condenser 16 is omitted for simplicity, arrows indicate the relative direction of telephonic current flow through the various branches and circuits. The direct battery supply current is not indicated, said current merely serving to energize the transmitter so that actuations of said transmitter cause it to function as a source of telephonic energy. In said figure elements in which there is no flow of current corresponding to actuation of the transmitter are indicated in dotted lines. Referring to Fig. 2, the operation of transmitting will now be described. Actuation of the transmitter T sets up a flow of alternating current in said transmitter. The current flowing in the transmitter, denoted by $I_1$, divides at terminal 11, a part $I_4$ flowing out over the line, said current being the usefully transmitted current, while a part $I_3$ flows through the auxiliary resistance and is wasted therein. Since, when the substation is proportioned in accordance with the rules of design hereinafter set forth, the substation is free from side tone, no telephonic current flows in receiver R during transmission, and said element is indicated therefore in dotted lines. This condition is only attained when the relative number of turns of windings $N_1$, $N_2$, $N_3$ and $N_4$ are properly proportioned with reference to the impedances of line L and auxiliary resistance X. When they are so properly proportioned the induced voltage in winding $N_2$ just balances the potential difference between terminals 7 and 13 and no current flows in said branch.

The proportioning of the component elements of the substation of Fig. 1 in order to satisfy the requirement that the transmitter and receiver shall be conjugate, will now be deduced.

In the derivation of the succeeding formulæ certain simplifying assumptions will be made. It will be assumed that the resistances of the transformer windings and the reactance of the condenser are negligibly small, that there is no magnetic leakage between the transformer windings and that the self-inductances of said windings are very large compared with the impedances of any of the other component elements of the substation and the line impedance. Experience has shown that these simplifying assumptions are justified and that the assumed conditions may be closely realized in practice by careful design. The impedances of line, transmitter, receiver and auxiliary resistance will be denoted by $R_4$, $R_1$, $R_2$ and $R_3$ respectively and the currents flowing in said elements by $I_4$, $I_1$, $I_2$ and $I_3$ respectively. The number of turns in coils $N_1$, $N_2$, $N_3$ and $N_4$ will be denoted by $n_1$, $n_2$, $n_3$ and $n_4$ respectively. Referring now to Fig. 2, it will be clear that $$I_2 = 0$$

and $$I_1 = I_3 + I_4.$$

Further if the transformer coils have very high self impedance, the magnetizing current is negligibly small and consequently $$n_1 I_1 = n_3 I_3 + n_4 I_4.$$

Consequently, as regards transmission.

$$(n_1 - n_3) I_3 = (n_4 - n_1) I_4$$

and $$I_3 = I_1 \left( \frac{n_1 - n_4}{n_3 - n_4} \right) \quad (7)$$

$$I_4 = I_1 \left( \frac{n_1 - n_3}{n_4 - n_3} \right)$$

Now letting V denote the potential difference between terminals 11 and 6, it is clear that the same potential difference exists between terminals 10 and 5, 13 and 7, and 14 and 8. The voltages induced in the four coils are clearly proportional to the relative number of turns of the coils; thus if K denotes the voltage induced per turn the voltages induced in coils $N_1$, $N_2$, $N_3$ and $N_4$ are clearly $Kn_1$, $Kn_2$, $Kn_3$ and $Kn_4$ respectively. It will then be evident that, since the voltage impressed between two terminals is equal to the impedance drop between said terminals, $$V = K n_4 + R_4 I_4$$
$$V = K n_3 + R_3 I_3$$
$$V = K n_2$$

Eliminating V $$K(n_2 - n_4) = R_4 I_4$$
$$K(n_2 - n_3) = R_3 I_3$$

Eliminating K $$\frac{R_3}{R_4} = \left(\frac{n_2 - n_3}{n_2 - n_4}\right) \frac{I_4}{I_3}$$

But as shown above $$\frac{I_3}{I_4} = \frac{n_1 - n_3}{n_4 - n_1}$$

whence $$\frac{R_3}{R_4} = \frac{(n_2 - n_3)(n_1 - n_3)}{(n_2 - n_4)(n_4 - n_1)}$$
$$= -\frac{(n_3 - n_2)(n_3 - n_1)}{(n_4 - n_2)(n_4 - n_1)} \quad (8)$$

Equation (8) expresses the relations which must obtain among the component elements in order that no current shall flow through the receiver in consequence of the actuation of the transmitter.

Figure 3:
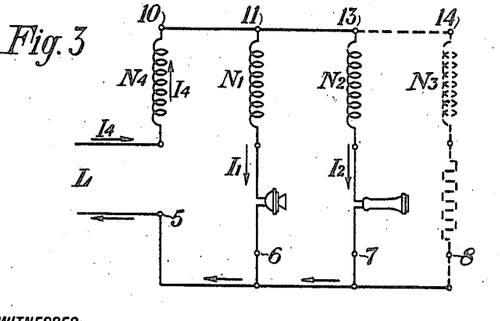

Referring now to Fig. 3 which is a diagram illustrating the operation of reception of signals over line L from a distant station, current $I_4$ flowing over line L enters the substation through winding $N_4$. This current divides at terminal 11, a part $I_1$, flowing through transmitter T, and the remainder $I_2$ flowing through receiver R. It is the latter current which constitutes the usefully received current. No current flows in auxiliary resistance X when the component elements are properly proportioned as hereinafter set forth. This is due to the fact that the voltage induced in winding $N_3$ just balances the voltage impressed between terminals 5 and 10.

The proper proportioning for conjugacy of line and auxiliary resistance will now be deduced. Referring to Fig. 3 and employing the same notation as that used in deriving equation (8), it will be clear that $I_4 = I_1 + I_2$ and that when the magnetizing current is negligible, $$n_4 I_4 = n_1 I_1 + n_2 I_2.$$

It therefore follows that, as regards reception, $$(n_1 - n_4) I_1 + (n_2 - n_4) I_2 = 0$$

and $$I_1 = I_4 \left(\frac{n_2 - n_4}{n_2 - n_1}\right)$$

$$I_2 = I_4 \left(\frac{n_1 - n_4}{n_1 - n_2}\right) \quad (9)$$

Further if V denotes the potential difference between terminals 10 and 5 and K the induced voltage drops per turn of each $$V = K n_1 + I_1 R_1$$
$$V = K n_2 + I_2 R_2$$
$$V = K n_3$$

Solving the last three equations and eliminating V and K $$\frac{R_2}{R_1} = \frac{I_1}{I_2} \left(\frac{n_3 - n_2}{n_3 - n_1}\right)$$

Eliminating $\frac{I_1}{I_2}$ by equation (9) it follows that $$\frac{R_2}{R_1} = -\frac{(n_2 - n_4)(n_2 - n_3)}{(n_1 - n_4)(n_1 - n_3)} \quad (10)$$

This is the formulation of the relations which must obtain among the component elements in order that line and auxiliary resistance shall be conjugate.

The conditions necessary to the satisfaction of the remaining fundamental requirements of the ideal substation, will now be formulated for the substation of Fig. 1. Considering requirement (4) which is formulated in equation (1), it is evident that this requirement may be written as:

$$R_4 = R_1 \left(\frac{I_1}{I_4}\right)^2 + R_2 \left(\frac{I_2}{I_4}\right)^2$$

whence by equation (9)

$$R_4 = R_1 \left(\frac{n_2 - n_4}{n_2 - n_1}\right)^2 + R_2 \left(\frac{n_1 - n_4}{n_1 - n_2}\right)^2 \quad (11)$$

Considering next requirement (4) as formulated by equation (2) and eliminating the currents therefrom by aid of equations (7), $$R_1 = R_3 \left(\frac{n_1 - n_4}{n_3 - n_4}\right)^2 + R_4 \left(\frac{n_1 - n_3}{n_4 - n_3}\right)^2 \quad (12)$$

Finally by aid of equations (7) the fifth fundamental requirement as formulated in equation (6) is expressible as:

$$R_1 = y R_2 \left(\frac{n_1 - n_4}{n_2 - n_4}\right)^2 \quad (13)$$

Equations 8, 10, 11, 12 and 13 formulate all the conditions necessary to the satisfaction of the fundamental substation requirements. It remains to put these equations in more convenient form for use as design formulæ. In particular it is desirable to express the constants of the substation in terms of $R_1$, $R_4$ and $y$ since these quantities are generally specified in practice. The combination of equations (10) and (11) gives by the elimination of $R_2$, $$\frac{R_1}{R_4} = \frac{(n_1 - n_2)(n_1 - n_3)}{(n_4 - n_2)(n_4 - n_3)} \quad (14)$$

The same result follows from the elimination of $R_3$ from equations (8) and (12).

Equations (10), (13) and (14) reduce to $$\frac{n_4-n_3}{n_1-n_3}=\pm\sqrt{\frac{R_4}{R_1}\left(\frac{1+y}{y}\right)}$$

$$\frac{n_2-n_4}{n_2-n_1}=\pm\sqrt{\frac{R_4}{R_1}\left(\frac{y}{1+y}\right)} \quad (15)$$

In these last two equations the right hand side is double valued indicating that there are two substations corresponding to two modes of winding the transformer coils. Practical considerations render preferable that mode of winding corresponding to the solution with negative signs. If the $$\frac{R_4}{R_1}$$

is denoted by A and $$\frac{1+y}{y}$$

by $h$, the results of equations 8, 10, 11, 12, 15 are expressed in the following design formulæ.

$$\left.\begin{array}{l}\dfrac{n_3-n_4}{n_3-n_1}=-Ah \\[4pt] \dfrac{n_2-n_4}{n_2-n_1}=-A/h \\[4pt] \dfrac{n_1-n_4}{n_3-n_1}=-(Ah+1) \\[4pt] \dfrac{n_1-n_4}{n_2-n_1}=-(A/h+1) \\[4pt] R_3=R_4\dfrac{1}{y(Ah+1)^2} \\[4pt] R_2=R_4\dfrac{1}{(1+y)(A/h+1)^2}\end{array}\right\} (A)$$

Inspection of the substation illustrated in Fig. 1 shows that the auxiliary resistance X is in series with winding $N_3$. Instead of providing a separate resistance element and a separate winding it is convenient and economical to combine the two elements in a single winding having a definite resistance equal to that of X of Fig. 1 and the same number of turns as winding $N_3$ of Fig. 1. Moreover it is unnecessary to provide four separate windings since four points may always be connected by three windings.

Figure 4:
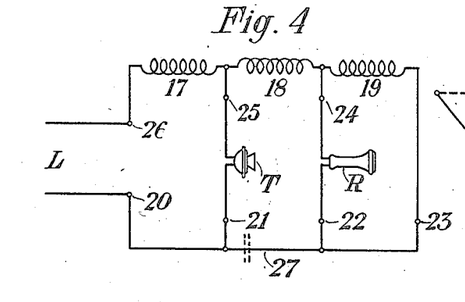
Figure 4A:
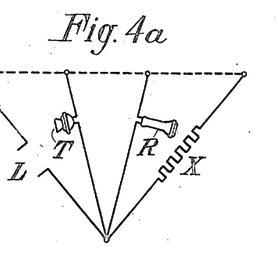

Fig. 4 is a diagram illustrating a substation equivalent to that of Fig. 1 and differing only in that three windings instead of four are employed and the auxiliary resistance is incorporated in one of said windings. Referring to Fig. 4, the arrangement will be readily understood. A telephone line L is connected to a substation comprising a transmitter T, a receiver R and a three winding transformer having two low resistance windings 17 and 18, and a high resistance winding 19, said windings being on a common core and preferably having very small leakage. Terminals 20, 21, 22 and 23 of line, transmitter, receiver and high resistance winding 19 are connected together. The other terminal of such high resistance winding is connected to terminal 24 of receiver R. Terminals 24 and 25 of receiver and transmitter respectively are connected by winding 18, while terminals 25 and 26 of transmitter and line respectively are connected by winding 17. If it is desired to exclude battery supply current from receiver R and winding 19 a condenser may be inserted, preferably in conductor 27.

Figure 5:
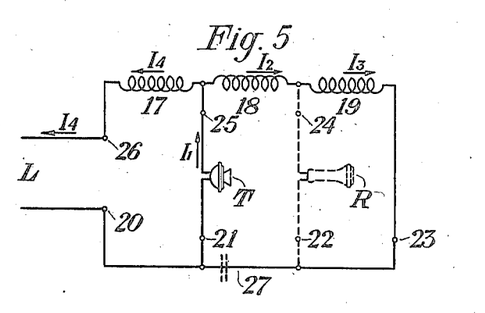
Figs. 5 and 6 are diagrams illustrating the flow of telephone current during transmission and reception respectively in the substation of Fig. 4.

Fig. 5 is a diagram illustrating the operation of transmitting and the relative direction of flow of telephonic currents in the substation of Fig. 4, elements in which no current flows being shown in dotted lines. Referring to Fig. 5, actuation of the transmitter sets up an alternating electromotive force therein. Consequently an alternating current $I_1$ flows through the transmitter, said current dividing at the transmitter, a part $I_4$ flowing through winding 17 and thence out on the line and the remainder $I_3$ flowing through windings 18 and 19. When the substation is proportioned for conjugacy of transmitter and receiver no current flows through the receiver during transmission. It is evidently necessary therefore that terminals 22 and 24 be equi-potential, and this condition is satisfied if the electromotive force induced in winding 18 just balances the potential difference across the transmitter terminals 25 and 21. It is also necessary that the voltage induced in winding 19 shall just supply the electromotive force necessary to drive current $I_3$ through the resistance $R_3$ of said winding. These conditions are satisfied when the substation is proportioned in accordance with the design formulæ hereinafter set forth.

Figure 6:
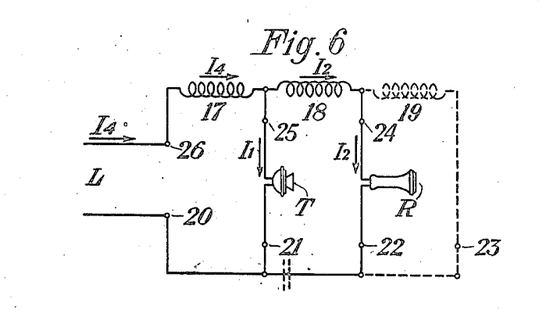

The operation of receiving is illustrated in Fig. 6. Referring to said figure current $I_4$ flows in over line L to the substation, a part $I_1$ of said current flowing through transmitter T and a part $I_2$ flowing through receiver R. No current flows through winding 19 if the line and the auxiliary resistance (incorporated in the winding of coil 19) are conjugate. The necessary and sufficient condition therefore is that the voltage induced winding 19 shall just balance the potential difference between receiver terminals 24 and 22.

It is not necessary to independently derive the design formulæ peculiar to the substation of Fig. 4 since said substation is a specific embodiment of the type of circuit illustrated in Fig. 1. The appropriate design formulæ are therefore derivable from design formulæ A. In the following formulæ the number of winding turns on coils 19, 18 and 17 will be denoted $W_1$, $W_2$, and $W_3$. Referring now to the first of design formulæ (A) it will be observed by inspection of Fig. 1 that $n_3-n_4$ is the effective number of winding turns directly connecting corresponding terminals of auxiliary resistance and line, while $n_3-n_1$ is the effective number of turns connecting auxiliary resistance and transmitter. Clearly by reference to Fig. 4 the corresponding number of winding turns are $W_1-W_2+W_3$ and $W_1-W_2$ respectively. The negative sign is placed before $W_2$ since, as shown in Fig. 4, the direction of winding of coil 18 is opposite to that of coils 17 and 19. Assigning the same significance to symbols A and $h$, the first form of formulæ (A) become, when applied to the substation of Fig. 4, $$\frac{W_1-W_2+W_3}{W_1-W_2}=-Ah$$

$$\frac{W_2-W_3}{W_2}=-A/h$$

$$\frac{W_3}{W_1-W_2}=-(Ah+1)$$

$$\frac{W_3}{-W_2}=-(A/h+1)$$

Since of these formulæ the first and third and the second and fourth are equivalent, one of each pair is superfluous. Further it is only necessary to specify the ratios of the number of winding turns on the coils and not their absolute values. Denoting then by $r$ and $r'$, $\frac{W_2}{W_1}$ and $\frac{W_3}{W_1}$ respectively and including the last two of formulæ (A), the appropriate design formulæ of the substation are as follows:

$$\left. \begin{array}{l} r=\dfrac{Ah+1}{A(h-1/h)} \\[6pt] r'=\dfrac{(Ah+1)(A/h+1)}{A\left(h-\dfrac{1}{h}\right)} \\[10pt] R_3=R_4\dfrac{1}{y(Ah+1)^2} \\[6pt] R_2=R_4\dfrac{1}{(1+y)(A/h+1)^2} \end{array} \right\} \text{(B)}$$

As an illustration of the use of formulæ (B) let it be required to design the substation of Fig. 4 for maximum over-all efficiency the line impedance being 600 ohms and the transmitter resistance 150 ohms. The $R_1=150$, $R_4=600$, $y=1$, so that $A=2$ and $h=\sqrt{2}$. Substituting these numerical values in formulæ (B) the constants of the substation are as follows:—$r=2.707$; $r'=6.34$; $R_3=41.2$ ohms; $R_2=51.5$ ohms.

Figure 7:
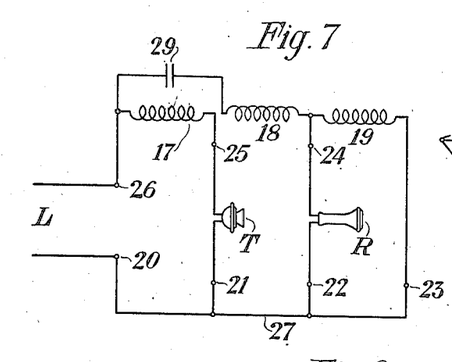
Figure 7A:
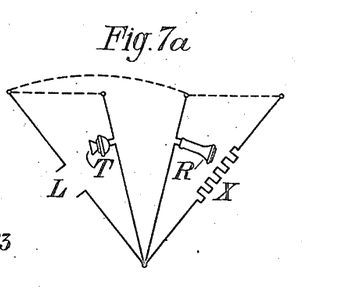

Fig. 7 is a diagram of a substation which differs from that of Fig. 4 only in the connections of the transformer coils. Referring to Fig. 7 it will be seen that winding 18, is connected to terminal 26 of line L instead of to terminal 25 of transmitter T. In all other structural respects the substations illustrated in Figs. 4 and 7 are identical. A condenser 29 may be inserted in the lead connecting winding 18 with terminal 26 if it is desired to confine the battery supply current to transmitter T. Winding 19 is a high resistance winding of resistance $R_3$.

Figure 8:
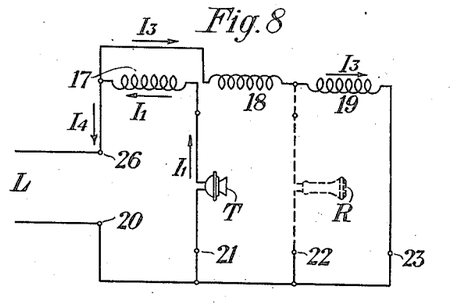
Figs. 8 and 9 are diagrams illustrating the flow of telephonic currents during transmission and reception respectively in the substation of Fig. 7.

Fig. 8 is a diagram illustrating the operation of transmitting of the substation of Fig. 7. Referring to Fig. 8, actuation of transmitter T sets up an alternating telephonic current $I_1$ in the transmitter branch. Said current flows through winding 17 and then divides, a part $I_4$ flowing out over the line to the distant station and a part $I_3$ flowing through windings 18 and 19. When the substation is properly proportioned in accordance with the design formulæ hereinafter given no current flows through receiver R. It is necessary, therefore, that the induced voltage in coil 18 shall oppose and neutralize the potential difference across terminals 26 and 20 of line L, and further that the induced voltage in winding 19 shall supply the electromotive force necessary to drive the current $I_3$ through the resistance $R_3$ of said winding. The induced voltages in coils 18 and 19 are therefore in opposite directions and said coils are oppositely wound on the magnetic core of the transformer.

Figure 9:
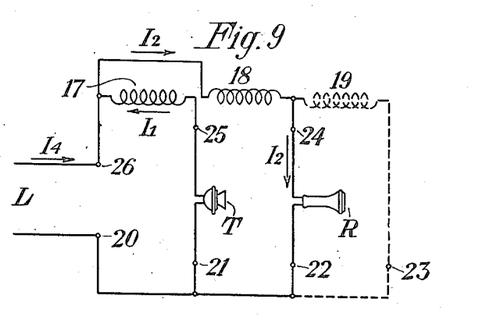

Fig. 9 is a diagram illustrating the operation of receiving of the substation of Fig. 7. Referring to Fig. 9, a current $I_4$ enters the substation over line $L_1$ a part $I_1$ flowing through coil 17 and thence through transmitter $T_1$ and a part $I_2$ flowing through coil 18 and receiver R. The voltage induced in coil 19 balances and opposes the potential difference between terminals 24 and 22 of receiver R so that no current flows through said coil. The currents $I_1$ and $I_2$ are then inversely proportional to the number of turns on coils 17 and 18 respectively.

The appropriate design formulæ for the substation of Fig. 7 are now readily deduced by comparison of Figs. 1 and 7 and by reference to formulæ (A). The number of turns of coils 19, 18 and 17 will be denoted by $W_1$, $W_2$ and $W_3$ respectively. Also $r$ and $r'$ will denote $\frac{W_2}{W_1}$ and $\frac{W_3}{W_1}$ respectively. The appropriate design formulæ are then:

$$\left. \begin{array}{l} \frac{r'}{1-r-r'} = -(Ah+1) \\ \frac{r'}{r+r'} = A/h+1 \\ R_3 = R_4 \frac{1}{y(Ah+1)^2} \\ R_2 = R_4 \frac{1}{(1+y)(A/h+1)^2} \end{array} \right\} (C)$$

Figure 10:
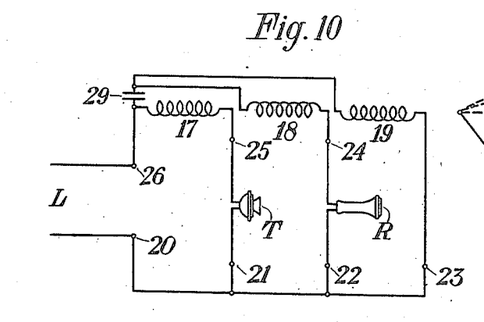
Figure 10A:
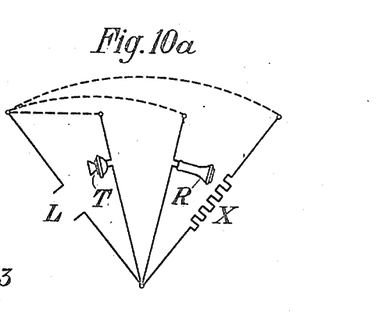

Fig. 10 is a diagram illustrating a third specific embodiment of the substation of my invention, differing from those of Figs. 4 and 7 in the connections of the transformer windings only. Referring to Fig. 10, it will be seen that the corresponding terminals of coils 17, 18 and 19 are all connected to terminal 26 of line $L_1$ the other connections and the arrangements being identical with those of Figs. 4 and 7 and similarly designated.

Figure 11:
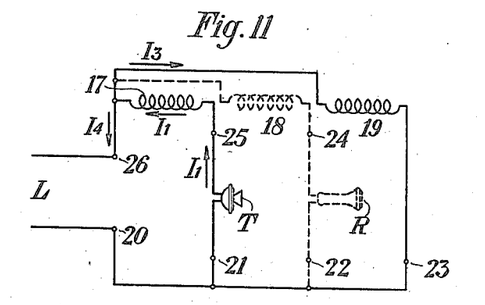
Figs. 11 and 12 are diagrams illustrating the flow of telephonic current during transmission and reception respectively in the substation of Fig. 10.

Fig. 11 is a diagram illustrating the operation of transmitting and indicating by arrows the relative directions of flow of the telephonic currents during transmission for the substation of Fig. 11. Referring to Fig. 11, actuation of transmitter T sets up a telephonic current $I_1$ in the transmitter branch. This current divides, a part $I_4$ flowing out over the line to the distant station and a part $I_3$ flowing through winding 19 whose resistance is denoted by $R_3$. No current flows through receiver R and it is therefore necessary that the voltage induced in coil 18 shall balance and oppose the potential difference between terminals 26 and 20 of line L. Since current $I_1$ flows in coil 17 and current $I_3$ in coil 19 it is necessary that said currents be inversely proportional to the relative number of turns of windings 17 and 19.

Figure 12:
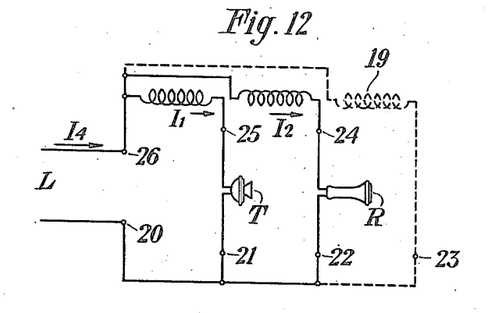

Referring to Fig. 12 the operation of receiving by the substation of Fig. 10 will be described. Current $I_4$ reaches the substation over line L. This current divided at terminal 26, a part $I_1$ flowing through winding 17 and transmitter $T_1$ and a part $I_2$ flowing through winding 18 and receiver R. No current flows through winding 19 and the voltage induced in said coil must therefore balance and oppose the potential difference between line terminals 26 and 20. Further the transmitter current $I_1$ and receiver current $I_2$ must be inversely proportional to the relative number of turns of windings 17 and 18 respectively.

Denoting the number of winding turns of coils 19, 18 and 17 by $W_1$, $W_2$ and $W_3$ respectively and the ratios $\frac{W_2}{W_1}$ and $\frac{W_3}{W_1}$ by $r$ and $r'$ respectively, the design formulæ, appropriate to the substation of Fig. 10 are:

$$\left. \begin{array}{l} \left(\frac{r'}{1-r'}\right) = -(Ah+1) \\ \frac{r'}{r+r'} = A/h+1 \\ R_3 = R_4 \frac{1}{y(Ah+1)^2} \\ R_2 = R_4 \frac{1}{(1+y)(A/h+1)^2} \end{array} \right\} (D)$$

Figure 13:
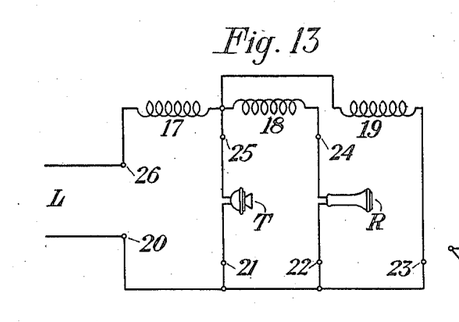
Figs. 13 and 14 are diagrams illustrating additional modifications of the substation shown in Fig. 1.
Figure 13A:
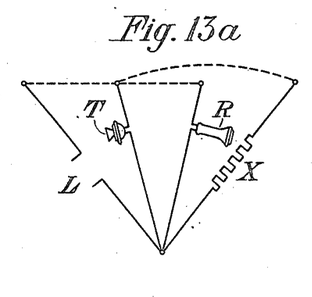

A fourth specific embodiment of the type circuit of Fig. 1 is illustrated in Fig. 13. Referring to said figure it will be seen that the arrangement is identical with that of Fig. 1 except the terminal of coil 19 which is connected in Fig. 1 to terminal 24 is connected to terminal 25 in the arrangement of Fig. 13. It is not believed necessary to illustrate in detail the operation of transmitting and receiving since these have been fully explained in connection with the arrangement of the preceding figures. Precisely the same fundamental requirements are satisfied by the substation of Fig. 13 provided that it is proportioned in accordance with the following design formulæ, using the notation previously employed:

$$\left. \begin{array}{l} r' = -(Ah+1) \\ \frac{r'}{r} = A/h+1 \\ R_3 = R_4 \frac{1}{y(Ah+1)^2} \\ R_2 = R_4 \frac{1}{(1+y)(A/h+1)^2} \end{array} \right\} (E)$$

Figure 14:
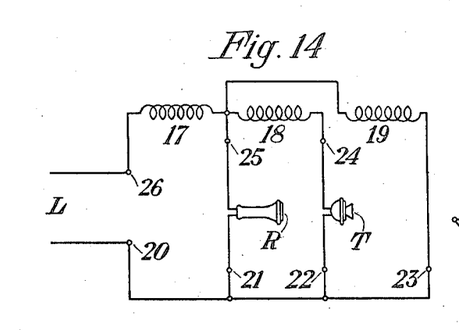
Figure 14A:
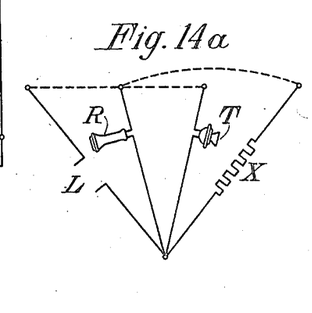

A final specific arrangement is illustrated in Fig. 14. Referring to Fig. 14 it will be seen that the arrangement then shown differs from that illustrated in Fig. 13 only in that the positions of transmitter and receiver are interchanged and that the direction of winding of coil 19 is reversed. The appropriate design formulæ are:

$$\left. \begin{array}{l} \frac{r'-r}{1-r} = (Ah+1) \\ \frac{r-r'}{r} = (A/h+1) \\ R_3 = R_4 \frac{1}{y(Ah+1)^2} \\ R_2 = R_4 \frac{1}{(1+y)(A/h+1)^2} \end{array} \right\} (F)$$

Inspection and comparison of design formulæ A, B, C, D, E, F shows that these formulæ are identical as regards the resistances $R_2$ and $R_3$ of receiver and high resistance winding respectively and differ only in the transformer ratios $r$ and $r'$ corresponding to the changes in coil connections.

The fundamental equivalence of the specific arrangements will be clear from inspection and comparison of Figs. 1$^a$, 4$^a$, 7$^a$, 10$^a$, 13$^a$ and 14$^a$ which are schematic drawings of the arrangements illustrated in Figs. 1, 4, 7, 10, 13 and 14 respectively. In these schematic drawings the transformer windings or coils are indicated by dotted lines, while L, T, R and X denote line, transmitter, receiver and auxiliary resistance respectively, said auxiliary resistance being actually incorporated in a transformer coil in the specific arrangements of Figs. 4, 7, 10, 13 and 14.

The type of substation disclosed above and illustrated in the accompanying drawing is but one of a large number employing only one transformer and one auxiliary resistance and all of these are ideal in the sense that they satisfy the fundamental requirements for an ideal substation, as stated heretofore in this specification. It will be understood therefore, that my invention is not limited to the specific embodiments herein illustrated, but is broadly directed to providing a substation comprising a single transformer and only one auxiliary element, which is so proportioned with reference to the line with which it is to be coöperatively combined, that it is ideally efficient and substantially without side tone. Furthermore, I do not desire to limit the design of the substations herein disclosed and illustrated to the accompanying design formulæ. These formulæ are derived on the assumption that ideal transformers are employed and that the component elements have no reactance, assumptions which are only approximately justified in practice. When particularly high precision is desired I may, therefore, proportion the substation more precisely by taking into account the fact that the transformer impedances are finite, and that the line and the various substation elements may have in general some reactance. The accompanying formulæ, however, give quite satisfactory results, and the methods by which they are derived will enable one skilled in the art, to compute more precisely the substation constants when desired.

It will be understood that in the appended claims, where certain elements are said to be conjugate, or certain impedance relations are said to exist, since in practice these conditions can, in general, only be approximated, these expressions will be satisfied by structures substantially conforming thereto, especially where some compromise with regard to the rigid requirements is necessary in order to discriminate against line noise. It will be further understood that while I have specifically illustrated and described my invention as embodied in a telephone substation it is capable of many and varied embodiments which render it applicable in other kinds of signaling systems and consequently my invention is not to be limited to the particular form and use herein disclosed.

What is claimed is:

1. The combination of a substation and a telephone line, said substation comprising a transmitter, a receiver, a transformer coil in parallel with one of said elements, a terminal common to said line, transmitter and receiver, and two other transformer coils connecting the remaining terminals of said line, transmitter and receiver.

2. The combination of a substation and a telephone line, said substation comprising a transmitter, a receiver, a three-coil transformer and an auxiliary resistance incorporated in one of said coils and in parallel with one of said substation elements, a terminal common to said line, transmitter and receiver, the other three terminals of said elements being connected by two other coils of said transformer.

3. The combination of a substation and a telephone line, said substation comprising a transmitter, a receiver, a three-coil transformer and an auxiliary resistance incorporated in one of said coils and in parallel with one of said substation elements, a terminal common to said line, transmitter and receiver, the other three terminals of said elements being connected by two other coils of said transformer, the component elements of said substation being so proportioned that said transmitter and receiver are conjugate.

4. The combination of a substation and a telephone line, said substation comprising a transmitter, a receiver, a three-coil transformer and an auxiliary resistance incorporated in one of said coils and in parallel with one of said substation elements, a terminal common to said line, transmitter and receiver, the other three terminals of said elements being connected by two other coils of said transformer, the component elements of said substation being so proportioned that said line and auxiliary resistance are conjugate.

5. The combination of a substation and a telephone line, said substation comprising a transmitter, a receiver, a three-coil transformer and an auxiliary resistance incorporated in one of said coils and in parallel with one of said substation elements, a terminal common to said line, transmitter and receiver, the other three terminals of said elements being connected by two other coils of said transformer, the component elements of said substation being so proportioned that the impedance of the substation, as seen from the line is equal to that of the line.

6. The combination of a substation and a telephone line, said substation comprising a transmitter, a receiver, a three-coil transformer and an auxiliary resistance incorporated in one of said coils and in parallel with one of said substation elements, a terminal common to said line, transmitter and receiver, the other three terminals of said elements being connected by two other coils of said transformer, the component elements of said substation being so proportioned that the impedance of the combination consisting of line, receiver and auxiliary resistance, as seen from the transmitter, is equal to that of the transmitter.

7. The combination of a substation and a telephone line, said substation comprising a transmitter, a receiver, a three-coil transformer and an auxiliary resistance incorporated in one of said coils and in parallel with one of said substation elements, a terminal common to said line, transmitter and receiver, the other three terminals of said elements being connected by two other coils of said transformer, the component elements of said substation being so proportioned that said transmitter and receiver are conjugate, said line and auxiliary resistance are conjugate, the impedance of the substation, as seen from the line is equal to that of the line, the impedance of the combination consisting of line, receiver and auxiliary resistance, as seen from the transmitter, is equal to that of the transmitter.

8. In a two way signaling system, a transformer having a plurality of windings, a circuit for the transmission and reception of signals, a transmitting circuit proper comprising a transmitting apparatus and one winding of said induction coil, a receiving circuit proper comprising a receiving apparatus and a second winding of said induction coil, and a balancing circuit including a third winding of said induction coil, said first mentioned circuit, said transmitting circuit proper, said receiving circuit proper and said balancing circuit having a common terminal, and said elements being so proportioned and related that the impedance of the combination comprising said first named circuit, said receiving circuit proper, said balancing circuit and said transformer, as seen from said transmitting circuit proper, is equal to the impedance of said transmitting circuit proper.

9. In a two way signaling system, a transformer having a plurality of windings, a circuit for the transmission and reception of signals, a transmitting circuit proper comprising a transmitting apparatus and one winding of said induction coil, a receiving circuit proper comprising a receiving apparatus and a second winding of said induction coil, and a balancing circuit including a third winding of said induction coil, said first mentioned circuit, said transmitting circuit proper, said receiving circuit proper and said balancing circuit having a common terminal, and said elements being so proportioned and related that said receiving circuit and said transmitting circuit proper are conjugate.

10. In a two way signaling system, a transformer having a plurality of windings, a circuit for the transmission and reception of signals, a transmitting circuit proper comprising a transmitting apparatus and one winding of said induction coil, a receiving circuit proper comprising a receiving apparatus and a second winding of said induction coil, and a balancing circuit including a third winding of said induction coil, said first mentioned circuit, said transmitting circuit proper, said receiving circuit proper and said balancing circuit having a common terminal, and said elements being so proportioned and related that said balancing circuit and said first named circuit are conjugate.

11. In a two way signaling system, a transformer having a plurality of windings, a circuit for the transmission and reception of signals, a transmitting circuit proper comprising a transmitting apparatus and one winding of said induction coil, a receiving circuit proper comprising a receiving apparatus and a second winding of said induction coil, and a balancing circuit including a third winding of said induction coil, said first mentioned circuit, said transmitting circuit proper, said receiving circuit proper and said balancing circuit having a common terminal, and said elements being so proportioned and related that the impedance of the combination, comprising said transmitting circuit proper, said receiving circuit proper, said balancing circuit and said transformer, as seen from said first named circuit, is equal to the impedance of said first named circuit.

12. In a two way signaling system, a transformer having a plurality of windings, a circuit for the transmission and reception of signals, a transmitting circuit proper comprising a transmitting apparatus and one winding of said induction coil, a receiving circuit proper comprising a receiving apparatus and a second winding of said induction coil, and a balancing circuit including a third winding of said induction coil, said first mentioned circuit, said transmitting circuit proper, said receiving circuit proper and said balancing circuit having a common terminal, and said elements being so proportioned and related that said transmitting circuit and said receiving circuit are conjugate; said first named circuit and said balancing circuit are conjugate; the impedance of the combination, comprising said first named circuit, said receiving circuit proper, said balancing circuit and said transformer, as seen from said transmitting circuit is equal to the impedance of said transmitting circuit; and the impedance of the combination, comprising said transmitting circuit proper, said receiving circuit proper, said balancing circuit and said transformer, as seen from said first named circuit is equal to the impedance of said first named circuit.

13. In a signaling system, a transmitting apparatus, a receiving apparatus, a circuit for the transmission and reception of energy and an auxiliary circuit provided with an auxiliary resistance, the transmitting apparatus, receiving apparatus and auxiliary circuit having a common terminal connected to one terminal of said first named circuit, and having their other terminals connected to the other terminal of said first named circuit through the windings of a transformer.

14. In a signaling system, a circuit for the transmission and reception of energy, a transmitting apparatus, a receiving apparatus, an auxiliary circuit including a resistance, said transmitting apparatus, receiving apparatus and auxiliary circuit having a common terminal connected to one terminal of said first named circuit, and a transformer, the other terminals of said transmitting apparatus, receiving apparatus, and auxiliary circuit being connected to the other terminal of said first named circuit through the coils of said transformer.

In testimony whereof, I have signed my name to this specification in the presence of two subscribing witnesses, this first day of September, 1916.

GEORGE A. CAMPBELL.

Witnesses:
JOHN R. CARSON,
C. C. ROSE.